Patented June 14, 1949

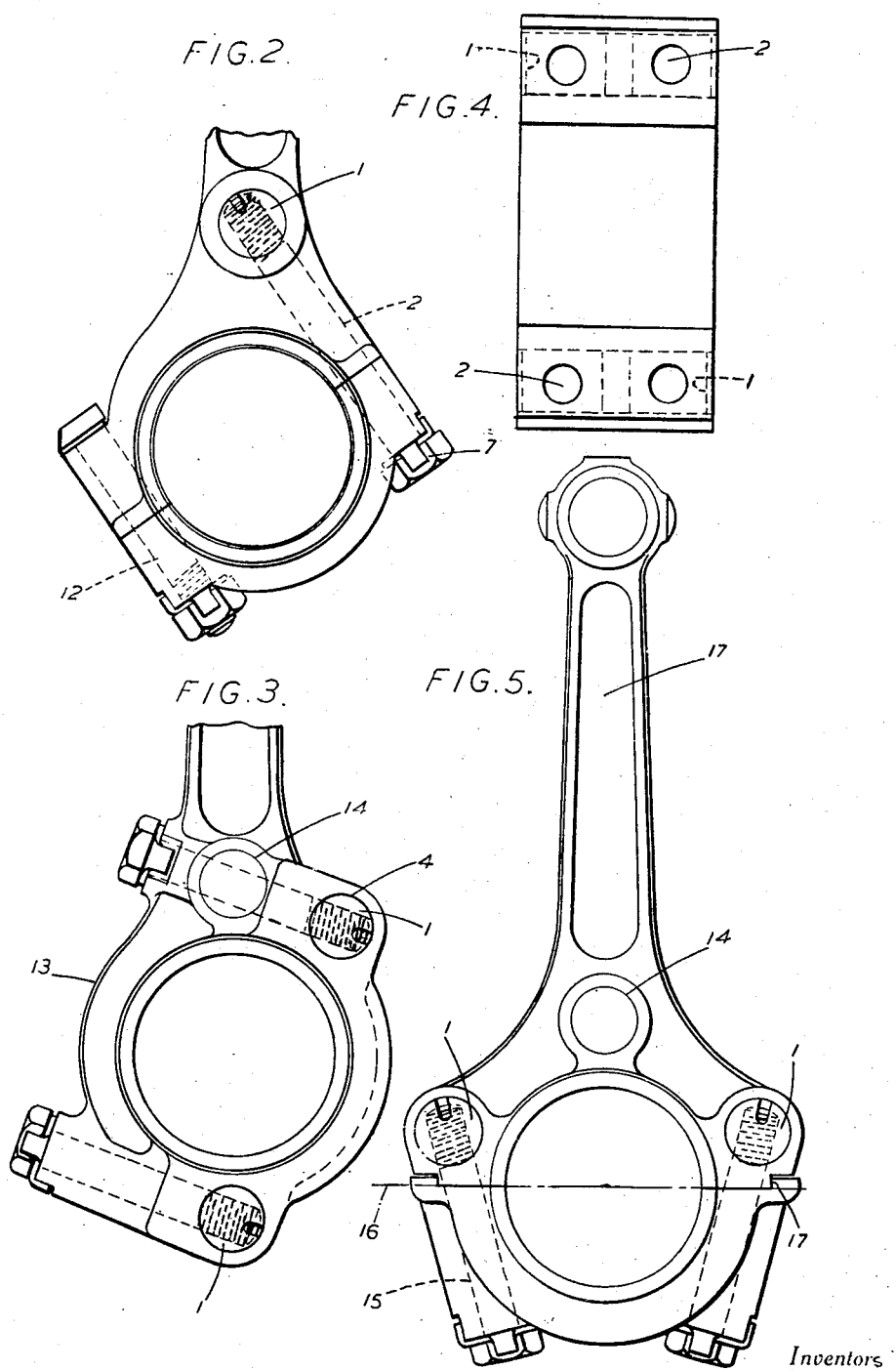

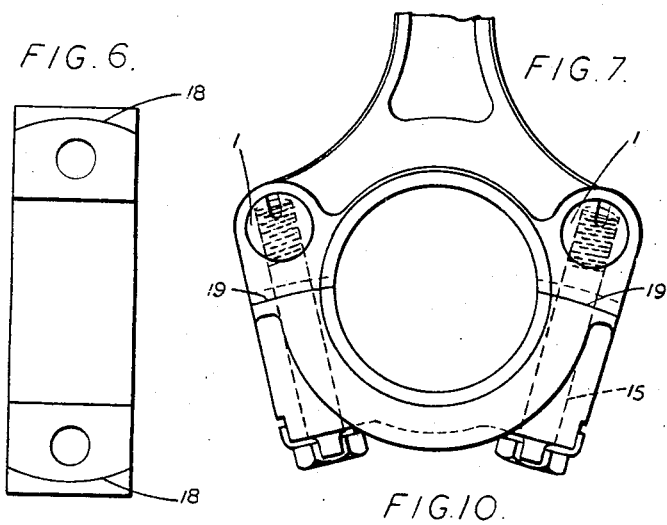
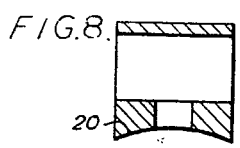
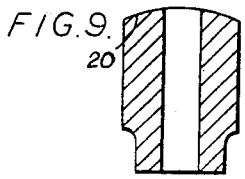
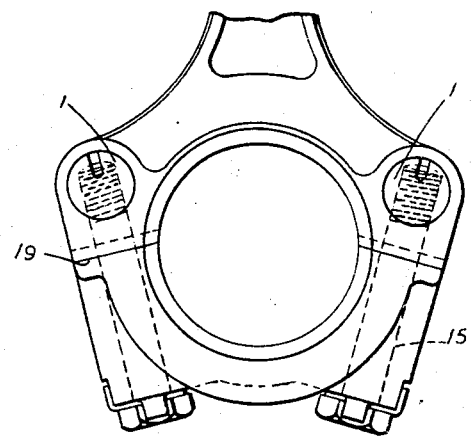
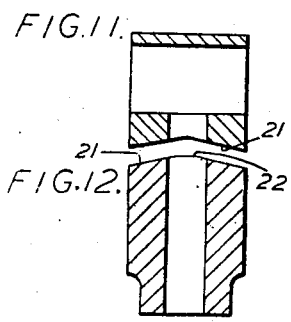
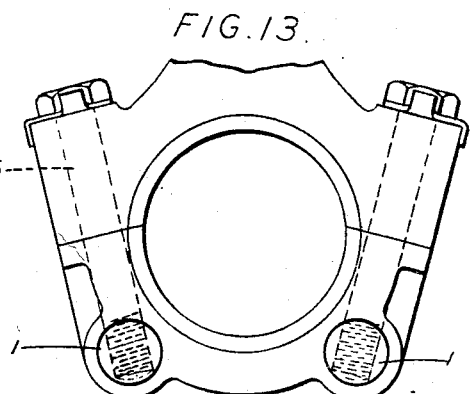

2,473,096

UNITED STATES PATENT OFFICE 2,473,096

CONNECTING ROD

William Wilson Hamill, Little Aston, and Robert Strange Crump, Birmingham, England Application October 27, 1944, Serial No. 560,624
In Great Britain December 1, 1943

4 Claims. (Cl. 74—579)

This invention relates to connecting rods used for coupling piston and crank in engines, compressors, and the like.

One of its objects is to diminish or remove undesired initial or tightening stresses in the cap holding bolts which arise from mal-alignment of the parts or their inability to adjust themselves properly to the line of tightening stress.

Another object is the provision of a location point early in the sequence of machining operations which facilitates subsequent machining operations.

Another object is to reduce the weight of the big end of the assembled rod for a given diameter of bearing.

Another object is to reduce the space occupied by the assembled big end for a given diameter of big end bearing.

Another object is a construction of rod and crank case which provide facilities for inspection, repair, or renewal of the big end bearing.

Reference may be had to the accompanying drawings in which—

Figures 2 and 3 show variations of the construction illustrated in Figure 1.

Figure 4 depicts an embodiment of the invention having four bolts.

Figures 5–13 illustrate other embodiments in which the cap holding bolts on opposite sides of the bearing are arranged to converge.

Figure 1:
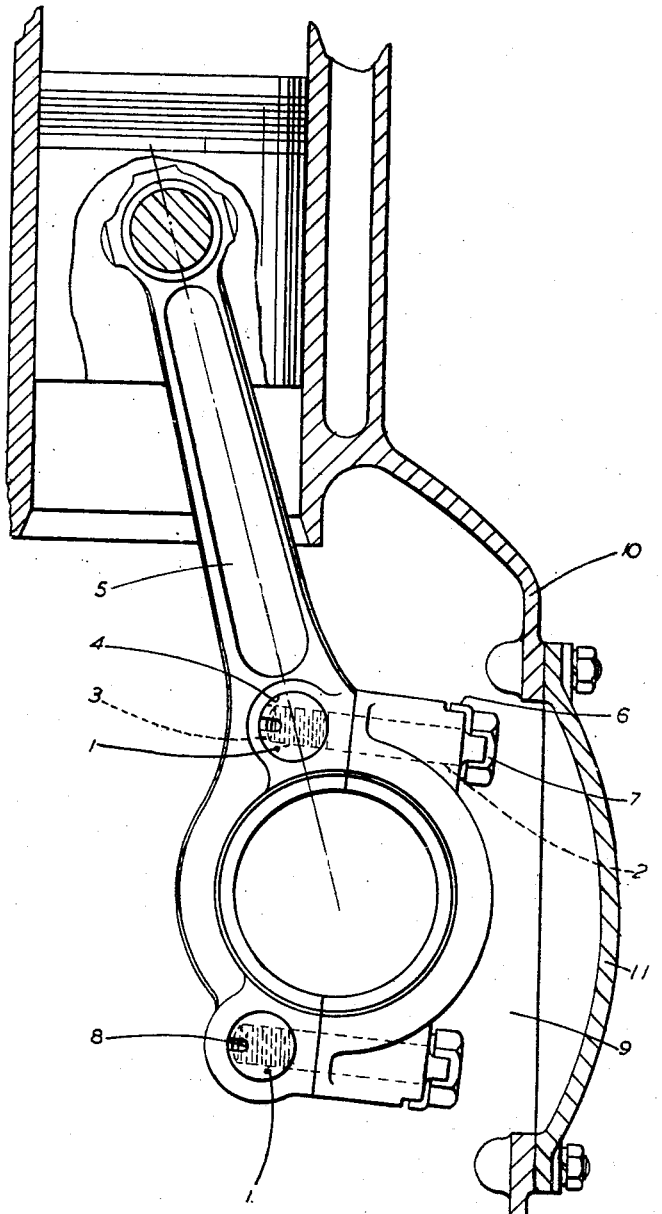
Figure 1 illustrates an application of the invention to an angularly split rod.

In Figure 1, the nut 1 whose thread is engaged by the bolt or set screw 2, has a curved or circular periphery 3 housed or seated in a curved or circular hole 4 in the rod body 5. Preferably the nut is not a tight fit in the hole but has a clearance of the order of a few thousandths of an inch, being thus capable also of float in an endwise direction in addition to the other degrees of freedom conferred by the peripheral clearance and the shape of the periphery where it is pulled by the bolt against the seat. In this manner, the nut is able to adjust and properly align itself with the bolt so that undesirable stresses from mal-alignment are avoided or substantially reduced when the bolt is pulled up tight.

Any appropriate means are adopted for locking e. g. a lock washer or plate 6 under the bolt head 7, and a split pin 8 to engage castellations in the screwed end of the bolt and a slot in the nut.

Preferably the bolt heads 7 are placed in positions favourable for access through apertures 9 or a single aperture in the side walls of the enclosing crank case 10 so that by removal of doors 11, work can be done on the big end bearings quickly and conveniently without removing the lower half of the crank case; in the vertical type of engine or compressor, the axis of the cap bolts can be oriented into an approximately horizontal position by suitable rotation of the crank shaft, and the bolt heads brought into close proximity to the access door wherethrough a box spanner can be readily applied to the bolt heads.

Since a hole which is circular is very convenient when used as a location point or datum for machining and other operations, the nut holes can be utilised for such purpose and in particular the hole nearest the small end of the rod, which with advantage is so placed that its axis lies on the longitudinal axis of the rod body when viewed from the face of the rod. As the nut-and-location hole is drilled parallel to the rod bearings, accuracy of machining is more readily obtained in subsequent operations.

In Figure 1, the division plane of cap and body makes an angle of 20° with the longitudinal axis of the body, which in conjunction with the improved and compact fastening allows the lateral dimension of the rod with cap removed to be considerably reduced so that it exceeds by a small percentage only, the diameter of the crankpin. This allows a large diameter crankpin to be used and still permit withdrawal or insertion of the rod through the cylinder bore.

If desired, an ordinary nut and bolt 12 Figure 2 may be used for the fastening remote from the small end of the rod. In this figure, the plane of division of cap and body is at a more obtuse angle relative to the centre line or longitudinal axis of the body, with a consequential increase in the withdrawal or insertion dimension above mentioned.

In a modification shown in Figure 3, the round nuts 1 and seating holes 4 are placed in the cap 13 instead of in the body, with the lower of the two having its axis on the extended centre line of the body. An additional hole 14 for location may be provided and situated as in the embodiments of Figures 1 and 2, which round hole 14 is traversed by the upper bolt.

For four-bolt rods, it is preferred to use two circular nut seats 4 but four separate round nuts 1 one for each bolt as depicted in Figure 4, so that each nut can adjust itself independently of its neighbour.

Figures 5–13 illustrate a group of embodiments in which the axes of the bolts 15 on opposite sides of the crankpin converge and if continued ultimately intersect in a direction away from the big end of the rod. In Figure 5, the plane of division of cap and body indicated by 16 passes through the centre of the crankpin and is at right angles to the longitudinal axis 17 of the body, and the abutting faces of cap and body are of spigot formation curved to a radius 18 struck from the journal centre. The round holes and nuts are similar to those already described, with a similar self-adjusting of swivelling action. A machining location hole 14 may also be provided.

Instead of the cap and body being divided on a single plane, there may be two regions of division 19 as shown in Figures 7, 10, and 13 at right angles to the respective axes of the two bolts. The abutting faces of cap and body may be spheroidal about the bolt axis as indicated at 20, Figures 7, 8, and 9, or conoidal about the bolt axis as shown at 21, Figures 10, 11 and 12, preferably with a flat 22 at the peak of the male cone in the cap.

In the converging bolt group of embodiments, the swivelling nuts and round seats may be placed in the body as depicted in Figure 13.

Having thus described our invention, what we claim is:

1. In combination, separable bearing members for forming a sleeve bearing and being separated longitudinally of the axis of the bearing, said members having formed therein registering bores, one of the members having formed therein a bore extending parallel with the bearing and transversely coincident with the registering bore of said member and having a curved surface on the side thereof toward the other of said members, a bolt for clamping together the separable members and having a threaded shank extending through the registering bores and with the threaded shank extending across said transverse bore, and a nut having a curved peripheral surface and fitting within said transverse bore with said curved peripheral surface seated against the curved surface of said bore to provide a self aligning action as the bolt shank is threaded into said nut.

2. In combination, separable bearing members for forming a sleeve bearing and being separated longitudinally of the axis of the bearing, said members having formed therein a plurality of registering bores, one of the members having formed therein a bore extending parallel with the bearing and transversely coincident with a plurality of the registering bores of said member and having a curved surface on the side thereof toward the other of said members, bolts for clamping together the separable members and having threaded shanks extending through said plurality of registering bores and with the threaded shanks extending across said transverse bore, and a plurality of nuts having curved peripheral surfaces and fitting within said transverse bore with said curved peripheral surfaces seated against the curved surface of said bore to provide a self aligning action as said bolt shanks are threaded into their respective nuts.

3. In combination, a connecting rod comprising separable bearing members for forming a sleeve bearing and being separated longitudinally of the axis of the bearing, said members having formed therein registering bores, one of the members having formed therein a bore extending parallel with the bearing and transversely coincident with the registering bore of said member and having a curved surface on the side thereof toward the other of said members, a bolt for clamping together the separable members and having a threaded shank extending through the registering bores and with the threaded shank extending across said transverse bore, and a nut having a curved peripheral surface and fitting within said transverse bore with said curved surface seated against the curved surface of said bore to provide a self aligning action as the bolt shank is threaded into said nut, said transverse bore being positioned on the longitudinal axis of said connecting rod so as to form a machining locating hole.

4. In combination, a connecting rod comprising separable bearing members for forming a sleeve bearing and being separated longitudinally of the axis of the bearing, one of said members forming the body portion at the end of said rod and the other of said members forming the cap portion, said members having formed therein registering bores, said body portion having formed therein a bore extending parallel with the bearing and transversely coincident with the registering bore of said member and having a curved surface on the side thereof toward the other of said members, a bolt for clamping together the separable members and having a threaded shank extending through the registering bores and with the threaded shank extending across said transverse bore, and a nut having a curved peripheral surface and fitting within said transverse bore with said curved surface seated against the curved surface of said bore to provide a self aligning action as the bolt shank is threaded into said nut, said transverse bore in said body portion member being positioned on the longitudinal axis of said connecting rod so as to form a machining locating hole.

WILLIAM WILSON HAMILL.
ROBERT STRANGE CRUMP.

REFERENCES CITED

The following references are of record in the file of this patent:

UNITED STATES PATENTS

| Number | Name | Date |
|---|---|---|
| 1,746,491 | Morgan | Feb. 11, 1930 |
| 1,836,949 | Balough | Dec. 15, 1931 |
| 1,885,911 | Haltenberger | Nov. 1, 1932 |

FOREIGN PATENTS

| Number | Country | Date |
|---|---|---|
| 410,210 | France | Mar. 9, 1910 |